(12) United States Patent
Kawakami et al.

(10) Patent No.: US 7,864,823 B2
(45) Date of Patent: Jan. 4, 2011

(54) LASER IRRADIATION APPARATUS

(75) Inventors: Ryusuke Kawakami, Kanagawa (JP); Norihito Kawaguchi, Tokyo (JP)

(73) Assignee: Semiconductor Energy laboratory Co., Ltd. (JP)

( * ) Notice: Subject to any disclaimer, the term of this patent is extended or adjusted under 35 U.S.C. 154(b) by 23 days.

(21) Appl. No.: 12/406,734

(22) Filed: Mar. 18, 2009

(65) Prior Publication Data

US 2009/0238223 A1  Sep. 24, 2009

(30) Foreign Application Priority Data

Mar. 24, 2008  (JP) ............................... 2008-075027

(51) Int. Cl.
- *H01S 3/10* (2006.01)
- *H01L 21/00* (2006.01)
- *A61N 5/00* (2006.01)
- *G21G 5/00* (2006.01)

(52) U.S. Cl. ........................ 372/27; 438/795; 250/492.2
(58) Field of Classification Search .................. 372/27; 438/795; 250/492.2
See application file for complete search history.

(56) References Cited

U.S. PATENT DOCUMENTS 6,650,480 B2    11/2003    Tanaka

FOREIGN PATENT DOCUMENTS

| EP | 1 926 131 A1 | 5/2008 |
|---|---|---|
| JP | 2004-95792 | 3/2004 |
| JP | 2004095792 A * | 3/2004 |
| JP | 2007-110064 | 4/2007 |
| JP | 2007110064 A * | 4/2007 |

* cited by examiner

*Primary Examiner*—Minsun Harvey
*Assistant Examiner*—Patrick Stafford
(74) *Attorney, Agent, or Firm*—Husch Blackwell LLP Welsh Katz (57) ABSTRACT

A laser irradiation apparatus is provided in which the occurrence of adverse effects on an object to be irradiated with a laser beam due to the difference in the polarization state between pulsed laser beams can be prevented or significantly reduced when the pulsed laser beams emitted from two laser light sources are guided to pass through the same optical path for irradiation of an object to be irradiated with the pulsed laser beams. The laser irradiation apparatus is provided with a first laser light source 3, a second laser light source 4, an optical path combining optical member 7 which guides the pulsed laser beams emitted from the first laser light source 3 and the second laser light source 4 to pass through the same optical path, and a polarization control member 9 which controls polarization state of the pulsed laser beam from the optical path combining optical member 7. The polarization control member 9 includes a first polarization control portion 13 and a second polarization control portion 15 through which beam components of the pulsed laser beam pass. The polarization states of the beam components that have passed through the first polarization control portion 13 and the beam components that have passed through the second polarization control portion 15 become different from each other. The beam components in different polarization states are superimposed on each other on a surface to be irradiated with the laser beam of the object to be irradiated with the laser beam.

6 Claims, 10 Drawing Sheets

LASER IRRADIATION APPARATUS

BACKGROUND OF THE INVENTION

1. Field of the Invention

The present invention relates to a laser irradiation apparatus in which a pulsed laser beam emitted from a first laser light source and a pulsed laser beam emitted from a second laser light source are guided to pass through the same optical path for irradiation of an object to be irradiated with the laser beams.

2. Description of the Related Art

Figure 9:
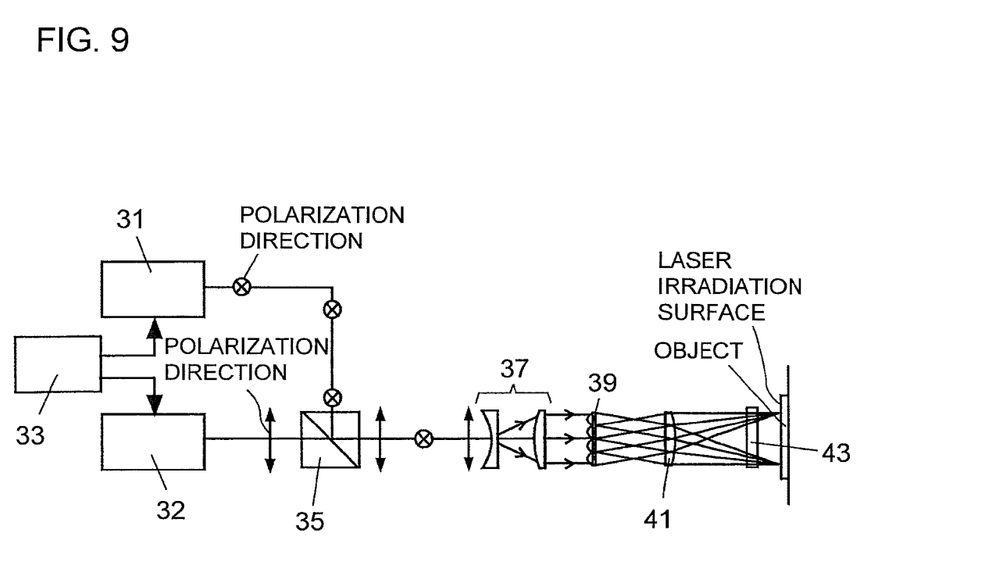
FIG. 9 is a structural view of a laser irradiation apparatus in which two laser resonators are employed.

Conventionally, a laser irradiation apparatus in which two laser light sources (laser resonators) each which emit a pulsed laser beam with a predetermined frequency are provided and a desired range of an object to be irradiated with a laser beam (e.g., a semiconductor substrate) is irradiated with a pulsed laser beam by using the two laser light sources has been developed (e.g., Patent Document 1 (Japanese Published Patent Application No. 2007-110064)). FIG. 9 shows a structural example of such a laser irradiation apparatus. As shown in FIG. 9, the laser irradiation apparatus is provided with a first laser resonator 31, a second laser resonator 32, a pulse control device 33, an optical path combining optical member 35, a beam expander 37, a cylindrical lens array 39, and a condenser lens 41.

The first laser resonator 31 emits a linearly-polarized pulse laser beam, of which the polarization direction is perpendicular on the plane of the paper of FIG. 9, with a predetermined frequency. The second laser resonator 32 emits a linearly-polarized pulse laser beam, of which the polarization direction is in an up and down direction on the plane of the paper of FIG. 9, with a predetermined frequency.

The pulse control device 33 controls the first laser resonator 31 and the second laser resonator 32 so as not to synchronize timing of emission of pulsed laser beams from the first laser resonator 31 and the second laser resonator 32.

The optical path combining optical member 35 can guide the pulsed laser beams to pass through the same optical path using the fact that the polarization directions of the pulsed laser beams from the first laser resonator 31 and the second laser resonator 32 are at 90° to each other. The optical path combining optical member 35 is a polarization beam splitter, for example, which reflects a pulsed laser beam polarized linearly in a perpendicular direction on the plane of the paper of FIG. 9 and transmits a pulsed laser beam polarized linearly in an up and down direction on the plane of the paper of FIG. 9. In this manner, with the use of the optical path combining optical member 35, the pulsed laser beams from the first laser resonator 31 and the second laser resonator 32 are guided to pass through the same optical path; accordingly, the frequency of a pulsed laser beam can be doubled and the power of a pulsed laser beam can be increased.

The beam expander 37 adjusts each of pulsed laser beams from the optical path combining optical member 35 so that the shapes thereof have an elongated shape. Each of the pulsed laser beams which have passed through the beam expander 37 is adjusted so that they have a cross-section with an elongated shape (e.g., a linear shape or a rectangular shape) in a direction perpendicular to the traveling direction of the pulsed laser beams on the surface to be irradiated with the laser beam of the object to be irradiated with the laser beam (e.g., a semiconductor substrate). In FIG. 9, the cross-sectional shapes are adjusted to have an elongated shape in an up and down direction in FIG. 9.

The cylindrical lens array 39 divides an incident pulsed laser beam into plural beams. The condenser lens 41 superimposes these divided beams on the surface to be irradiated with the laser beam of the object to be irradiated with the laser beam. Note that the reference numeral 43 denotes a short-side direction condenser lens which concentrates the pulsed laser beam on the surface to be irradiated with the laser beam with respect to a perpendicular direction on the plane of the paper of FIG. 9.

While the surface of the semiconductor substrate is irradiated successively with a pulsed laser beam with the above-described laser irradiation apparatus, the semiconductor substrate is transferred in a perpendicular direction on the plane of the paper of FIG. 9. In this manner, a desired range of the surface of the semiconductor substrate can be irradiated with the pulsed laser beam. Note that as an example of a prior art reference other than Patent Document 1, Patent Document 2 (Japanese Published Patent Application No. 2004-95792) can be given.

In the case where a semiconductor substrate is irradiated with a laser beam with the use of the laser irradiation apparatus in FIG. 9 for laser annealing treatment of the semiconductor substrate, there is a possibility that an object to be irradiated with a laser beam may be adversely affected by the difference in the polarization state between pulsed laser beams.

Figure 10:
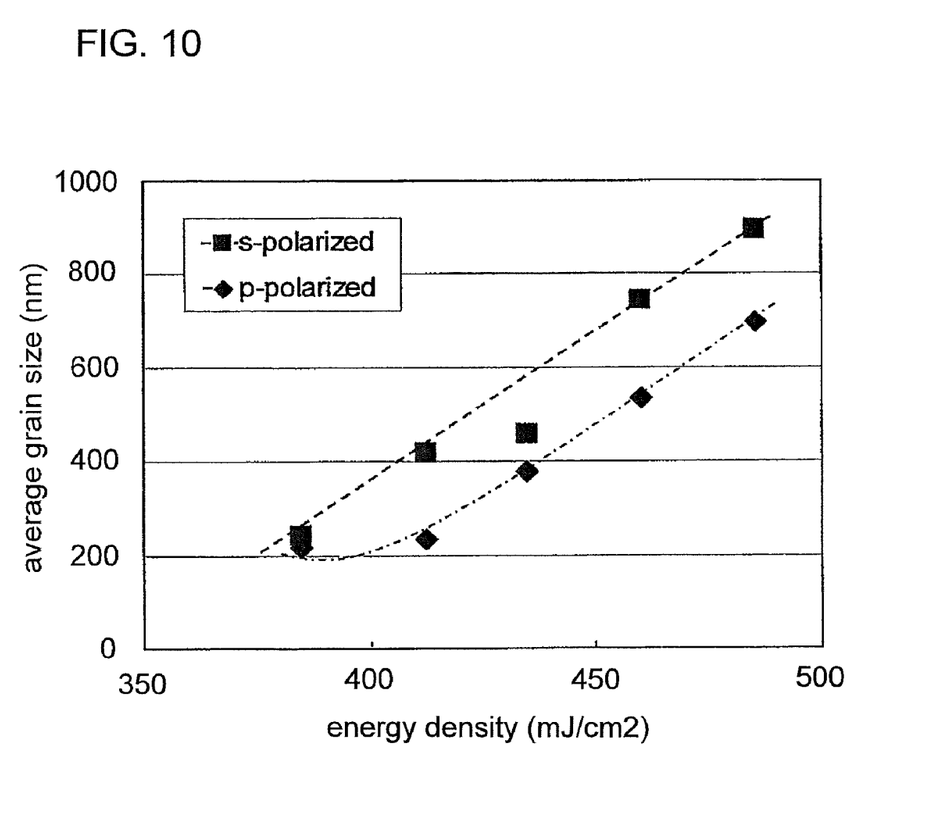
FIG. 10 is a graph showing a difference in the size of crystal grains in a semiconductor depending on the polarization direction in laser annealing of a semiconductor substrate.

An average size of crystal grains in a crystallized semiconductor is different between the case where laser annealing is performed by irradiating a desired range of a surface to be irradiated with a laser beam of a substrate on a surface of which an amorphous semiconductor is provided (hereinafter also referred to as an "amorphous semiconductor substrate") with only an s-polarized pulse laser beam and the case where laser annealing is performed by irradiating a desired range of a surface to be irradiated with a laser beam of an amorphous semiconductor substrate with only a p-polarized pulse laser beam. Here, the term "s-polarized" means a polarization state in which the direction of the electric field of a beam intersects with the traveling direction of a laser beam and is parallel to an up and down direction of the plane of the paper of FIG. 9 on a surface to be irradiated with a laser beam. The term "p-polarized" means a polarization state in which the direction of the electric field of a beam intersects with the traveling direction of the laser beam and is parallel to a perpendicular direction on the plane of the paper of FIG. 9 on a surface to be irradiated with a laser beam. FIG. 10 is a graph showing such a difference. In FIG. 10, the horizontal axis represents the energy density of a pulse laser beam with which a surface of an amorphous semiconductor substrate is irradiated, and the vertical axis represents the average size of crystal grains in a semiconductor crystallized by laser annealing. The squares represent measurement results in the case where the amorphous semiconductor substrate is irradiated with only an s-polarized pulse laser beam, and the diamonds represent measurement results in the case where the amorphous semiconductor substrate is irradiated with only a p-polarized pulse laser beam. As shown in FIG. 10, the size of crystal grains in a semiconductor, which are grown with an s-polarized pulse laser beam, is different from the size of crystal grains in a semiconductor, which are grown by a p-polarized pulse laser beam. Thus, when an amorphous semiconductor substrate is alternately irradiated with an s-polarized pulse laser beam and a p-polarized pulse laser beam, regions which are irradiated with only an s-polarized pulse laser beam and regions which are irradiated with only a p-polarized pulse laser beam are generated in some cases. As a result, there is a possibility that the size of crystal grains may be nonuniform; accordingly, a stable crystalline semiconductor cannot be obtained. As described above, there is a possibility that an object to be irradiated with a laser beam may be adversely affected by the difference in the polarization state between pulsed laser beams.

SUMMARY OF THE INVENTION

Accordingly, an object of a mode of the present invention is to provide a laser irradiation apparatus in which when pulsed laser beams from two laser light sources are guided to pass through the same optical path for irradiation of an object to be irradiated with the laser beams, the occurrence of adverse effects on the object to be irradiated with the laser beam due to the difference in the polarization state between the pulsed laser beams can be prevented or significantly reduced.

In order to achieve the above object, according to a mode of the present invention, a laser irradiation apparatus is provided which includes a first laser light source which emits a polarized pulse laser beam; a second laser light source which emits a polarized pulse laser beam of which the polarization state is different from the polarization state of the polarized pulse laser beam emitted from the first laser light source; an optical path combining optical member which guides the pulsed laser beam emitted from the first laser light source and the pulsed laser beam emitted from the second laser light source to pass through the same optical path; a polarization control member which is arranged in an arrangement direction perpendicular to a traveling direction of the pulsed laser beam from the optical path combining optical member and which includes a first polarization control portion which controls a polarization state of beam components of the pulsed laser beam from the optical path combining optical member and a second polarization control portion which controls a polarization state of the beam components of the pulsed laser beam from the optical path combining optical member so that the polarization state of the beam components of the pulsed laser beam from the optical path combining optical member is different from the polarization state of the first polarization control portion; and a laser beam superimposing optical member which superimposes the pulsed laser beam which has passed through the first polarization control portion and the pulsed laser beam which has passed through the second polarization control portion on each other on a surface to be irradiated with a laser beam of an object to be irradiated with a laser beam.

In the above-described structure, in the case where pulsed laser beams which are in different polarization states and are emitted from the first laser light source and the second laser light source are guided to pass through the same optical path for irradiation of an object to be irradiated with a laser beam, each of the pulsed laser beams emitted from the first laser light source and the second laser light source is divided into plural beam components in different polarization states (the first polarization state and the second polarization state) by the polarization control member, and the beam components in different polarization states are superimposed on each other on the surface to be irradiated with the laser beam of the object to be irradiated with the laser beam by the laser beam superimposing optical member. Accordingly, both of the pulsed laser beams are in a state in which the first polarization state and the second polarization state are mixed on the surface to be irradiated with the laser beam. Thus, the occurrence of adverse effects on the object to be irradiated with the laser beam due to the difference in the polarization state between pulsed laser beams can be prevented or significantly reduced.

Further, according to a mode of the present invention, in addition to the above-described structure, the laser irradiation apparatus may also include a pulse control device which controls the first laser light source and the second laser light source so as not to synchronize timing of emission of pulsed laser beams from the first laser light source and the second laser light source.

Furthermore, according to a mode of the present invention, in addition to the above-described structure, the laser irradiation apparatus may also include a beam expander which adjusts a shape of the pulsed laser beam from the optical path combining optical member to have an elongated shape and sends the pulsed laser beam having an elongated shape to the polarization control member.

According to a preferred embodiment mode of the present invention, the length of the first polarization control portion in the arrangement direction and the length of the second polarization control portion in the arrangement direction are set so that the total amount of energy of the beam components that have passed through the first polarization control portion is equal to or substantially equal to that of the beam components that have passed through the second polarization control portion.

As described above, since the length of the first polarization control portion in the arrangement direction and the length of the second polarization control portion in the arrangement direction are set so that the total amount of energy of the beam components that have passed through the first polarization control portion is equal to or substantially equal to that of the beam components that have passed through the second polarization control portion, in both of the pulsed laser beams emitted from the first laser light source and the second laser light source, the total amount of energy of the beam components in a first polarization state can be equal to or substantially equal to that of the beam components in a second polarization state on a surface to be irradiated with a laser beam. Accordingly, laser irradiation (e.g., laser annealing of a semiconductor substrate) can be performed more stably.

According to a preferred embodiment mode of the present invention, at least one of the first polarization control portion and the second polarization control portion is divided into plural parts so as to sandwich all or a part of the other in the arrangement direction.

As described above, at least one of the first polarization control portion and the second polarization control portion may be divided into plural parts so as to sandwich all or a part of the other in the arrangement direction. Even in the case of this structure, effects similar to the above-described effects can be obtained.

According to a preferred embodiment mode of the present invention, the polarization directions of linearly-polarized pulse laser beams emitted from the first laser light source and the second laser light source are at 90° to each other. The first polarization control portion is a half wave plate which rotates the polarization directions of beam components emitted from the first laser light source and the second laser light source by 90°. The second polarization control portion is a wave plate which does not change the polarization states of beam components emitted from the first laser light source and the second laser light source.

As described above, the polarization direction of the beam components which have passed through the half wave plate of the first polarization control portion is rotated by 90°, and the polarization state of the beam components which have passed through the second polarization control portion is not changed. Accordingly, the polarization state of beam components of the pulsed laser beam which have passed through the first polarization control portion can be different from that of beam components of the pulsed laser beam which have passed through the second polarization control portion.

According to an another embodiment mode of the present invention, the polarization directions of linearly-polarized pulse laser beams emitted from the first laser light source and the second laser light source are at 90° to each other. The first polarization control portion and the second polarization control portion are quarter wave plates which each have an optical axis at an angle of 45° with respect to each of the polarization directions of the pulsed laser beams emitted from the first laser light source and the second laser light source. The optical axes of the first polarization control portion and the second polarization control portion are at 90° to each other.

When an optical axis of a quarter wave plate makes an angle of 45° on one side with the polarization direction of a linearly-polarized laser beam, the quarter wave plate changes the laser beam passing through it to circularly polarized light whose polarization direction is rotated in a first direction. When an optical axis of a quarter wave plate makes an angle of 45° on the other side with the polarization direction of the linearly-polarized laser beam, the quarter wave plate changes the laser beam passing through it to circularly polarized light rotating in a direction opposite to the first direction. Thus, in the above-described structure, the first polarization control portion and the second polarization control portion are quarter wave plates which each have an optical axis at an angle of 45° with respect to each of the polarization directions of the pulsed laser beams emitted from the first laser light source and the second laser light source, and the optical axes of the first polarization control portion and the second polarization control portion are at 90° to each other. Therefore, the beam components which have passed through the first polarization control portion and the beam components which have passed through the second polarization control portion can be in circular polarization states in which their polarization directions rotate in directions opposite to each other. Accordingly, the beam components which have passed through the first polarization control portion and the beam components which have passed through the second polarization control portion can be in different polarization states.

It is preferable that the optical path length of the pulsed laser beam inside the second polarization control portion be equal to or substantially equal to that of the pulsed laser beam inside the first polarization control portion.

As described above, since the optical path length of the pulsed laser beam inside the second polarization control portion is equal to or substantially equal to that of the pulsed laser beam inside the first polarization control portion, difference in the optical path length of the pulsed laser beam does not occur between the first polarization control portion and the second polarization control portion. Accordingly, adverse effects due to the difference in the optical path length (e.g., image position error on a surface to be irradiated with a laser beam) can be prevented.

According to a mode of the present invention described above, in the case where pulsed laser beams from two laser light sources are guided to pass through the same optical path for irradiation of an object to be irradiated with the laser beams, the occurrence of adverse effects on the object to be irradiated with the laser beam due to the difference in the polarization state between the pulsed laser beams can be prevented or significantly reduced. Accordingly, by performing laser irradiation of a semiconductor substrate with the use of a laser irradiation apparatus which is a mode of the present invention, a stable crystalline semiconductor can be obtained.

DETAILED DESCRIPTION OF THE INVENTION

Embodiment Mode

The modes for carrying out the present invention will be described with reference to the accompanying drawings. Note that in the drawings, the same portions or portions having similar functions are denoted by the same reference numerals, and repeated description thereof is omitted.

Embodiment Mode 1

Figure 1:
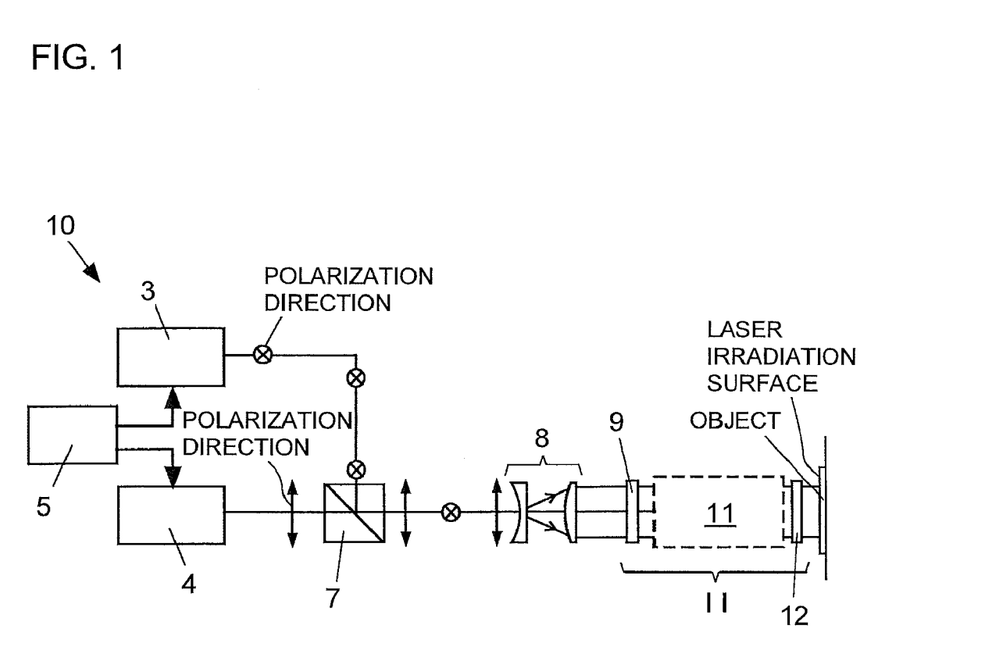
FIG. 1 is a structural view of a laser irradiation apparatus according to Embodiment Mode 1.
Figure 2:
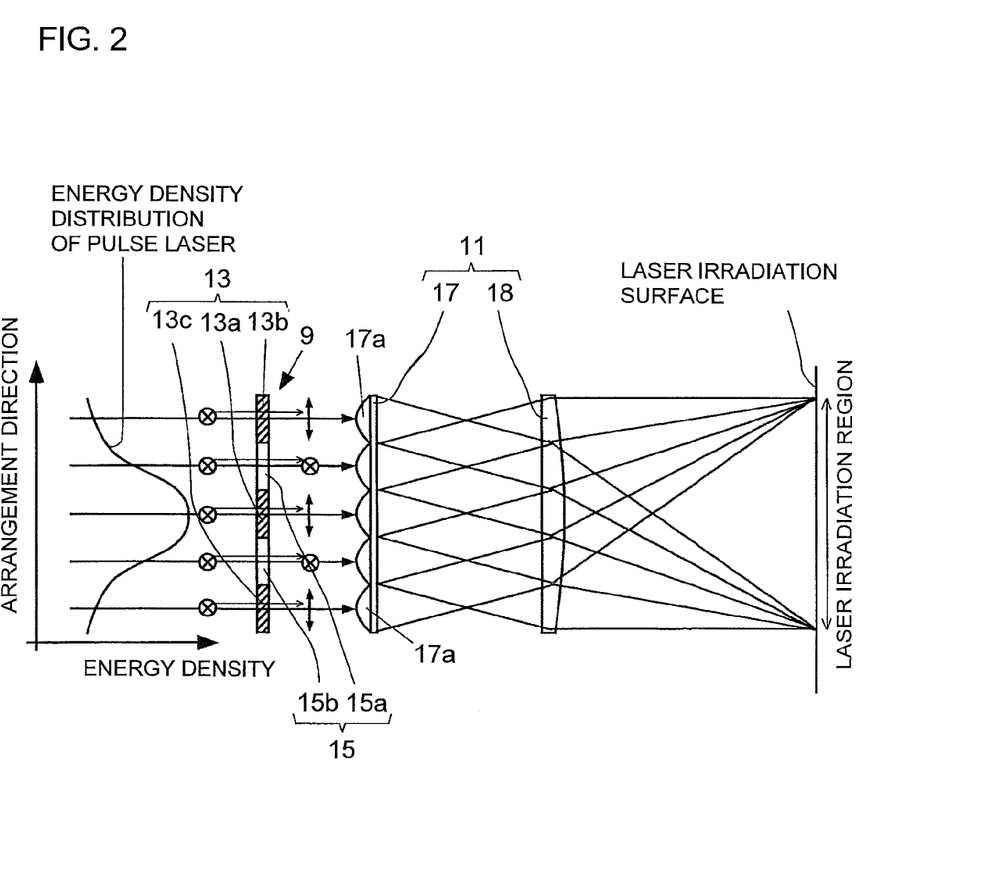
FIG. 2 is an enlarged view of a portion II in FIG. 1.

FIG. 1 is a structural view of a laser irradiation apparatus according to Embodiment Mode 1 of the present invention. FIG. 2 is an enlarged view of a portion II in FIG. 1. As shown in FIG. 1, a laser irradiation apparatus 10 is provided with a first laser light source 3, a second laser light source 4, a pulse control device 5, an optical path combining optical member 7, a beam expander 8, a polarization control member 9, and a laser beam superimposing optical member 11.

The first laser light source 3 is a laser resonator which emits a polarized pulse laser beam with a predetermined frequency. The second laser light source 4 is a laser resonator which emits, with a predetermined frequency, a pulsed laser beam which is polarized differently from the pulsed laser beam emitted from the first laser light source 3. In this example, the frequency of the pulsed laser beam emitted from the first laser light source 3 is equal to or substantially equal to that of the pulsed laser beam emitted from the second laser light source 4. In this embodiment mode, the first laser light source 3 emits a pulsed laser beam polarized linearly in a perpendicular direction on the plane of the paper of FIGS. 1 and 2 (hereinafter referred to as a "first linearly-polarized state") with a predetermined frequency. The second laser light source 4 emits a pulsed laser beam polarized linearly in an up and down direction on the plane of the paper of FIGS. 1 and 2 (hereinafter referred to as a "second linearly-polarized state") with a predetermined frequency.

The pulse control device 5 controls the first laser light source 3 and the second laser light source 4 so as not to synchronize timing of emission of pulsed laser beams from the first laser light source 3 and the second laser light source 4.

The optical path combining optical member 7 guides the pulsed laser beams emitted from the first laser light source 3 and the second laser light source 4 to pass through the same optical path. Thus, the frequency of a pulsed laser beam can be doubled and the power of a pulsed laser beam can be increased. The optical path combining optical member 7 may be the same as the optical path combining optical member 35 shown in FIG. 9. In an example of FIG. 1, the optical path combining optical member 7 is a polarization beam splitter which reflects the pulsed laser beam emitted from the first laser light source 3 and transmits the pulsed laser beam emitted from the second laser light source 4.

The beam expander 8 adjusts each of pulsed laser beams from the optical path combining optical member 7 so that the shapes thereof have an elongated shape. Each of the pulsed laser beams which have passed through the beam expander 8 is adjusted so that they have a cross-section with an elongated shape (e.g., a linear shape or a rectangular shape) in a direction perpendicular to the traveling direction of the pulsed laser beams on the surface to be irradiated with the laser beam of the object to be irradiated with the laser beam. In FIGS. 1 and 2, the cross-sectional shapes are adjusted to have an elongated shape in an up and down direction in FIGS. 1 and 2.

The polarization control member 9 controls the polarization state of the pulsed laser beam from the optical path combining optical member 7 and the beam expander 8. The polarization control member 9 is arranged in the arrangement direction perpendicular to the traveling direction of the pulsed laser beam (an up and down direction in FIG. 2) and is provided with a first polarization control portion 13 and a second polarization control portion 15 through which beam components of the pulsed laser beam from the optical path combining optical member 7 pass. The first polarization control portion 13 and the second polarization control portion 15 are formed so that the polarization states of the beam components which have passed through the first polarization control portion 13 (hatched portions in FIG. 2) and the beam components which have passed through the second polarization control portion 15 are different polarization states of the first polarization state and the second polarization state. At least one of the first polarization control portion 13 and the second polarization control portion 15 may be divided into plural parts so as to sandwich all or a part of the other in the arrangement direction. In an example of FIG. 2, the first polarization control portion 13 is divided into three polarization control elements 13a, 13b, and 13c. The second polarization control portion 15 is divided into two polarization control elements 15a and 15b. The polarization control element 15a is sandwiched between the polarization control elements 13a and 13b in the arrangement direction. The polarization control element 15b is sandwiched between the polarization control elements 13a and 13c in the arrangement direction. The polarization control element 13a is sandwiched between the polarization control elements 15a and 15b in the arrangement direction. In this embodiment mode, the length of the first polarization control portion 13 in the arrangement direction and the length of the second polarization control portion 15 in the arrangement direction are set so that the total amount of energy of the beam components that have passed through the first polarization control portion 13 is equal to or substantially equal to that of the beam components that have passed through the second polarization control portion 15. In addition, in this embodiment mode, the first polarization control portion 13 (the polarization control elements 13a, 13b, and 13c) is a half wave plate, and the second polarization control portion 15 (the polarization control elements 15a and 15b) is a wave plate which does not change the polarization state of beam components which pass through it (a whole wave plate) or a quartz plate. The half wave plate is arranged so as to rotate the polarization direction of the pulsed laser beam emitted from the first laser light source 3 by 90° and also rotate the polarization direction of the pulsed laser beam emitted from the second laser light source 4 by 90°. That is, an optical axis of the half wave plate makes an angle of 45° with the polarization direction of the pulsed laser beam emitted from the first laser light source 3 and also makes an angle of 45° with the polarization direction of the pulsed laser beam emitted from the second laser light source 4 so that the polarization directions of the pulsed laser beams emitted from the first laser light source 3 and the second laser light source 4 are rotated by 90° by the half wave plate. Accordingly, when beam components in the first linearly-polarized state pass through the half wave plate, the polarization state is changed to the second linearly-polarized state from the first linearly-polarized state. When beam components in the second linearly-polarized state pass through the half wave plate, the polarization state is changed to the first linearly-polarized state from the second linearly-polarized state. The second polarization control portion 15 (the polarization control elements 15a and 15b) transmits the pulsed laser beam, and the second polarization control portion 15 is formed using a material such that the optical path length of the pulsed laser beam inside the second polarization control portion 15 is formed using the same material as that of the optical path length of the pulsed laser beam inside the first polarization control portion 13. That is, the material of the second polarization control portion 15 is the same as that of the first polarization control portion 13. For example, the second polarization control portion 15 may be a whole wave plate or a quartz plate made of quartz. Thus, when beam components in the first linearly-polarized state pass through the second polarization control portion 15, the polarization state remains the first linearly-polarized state. When beam components in the second linearly-polarized state pass through the second polarization control portion 15, the polarization state remains the second linearly-polarized state.

The laser beam superimposing optical member 11 superimposes beam components in the first polarization state and beam components in the second polarization state on each other on the surface to be irradiated with the laser beam of the object to be irradiated with the laser beam. In this embodiment mode, the laser beam superimposing optical member 11 includes a cylindrical lens array 17 and a condenser lens 18. The cylindrical lens array 17 includes a plurality of convex cylindrical lenses 17a arranged in the arrangement direction. Thus, the pulsed laser beam that enters the cylindrical lens array 17 is divided into plural laser beams by the plurality of convex cylindrical lenses 17a. The plural divided laser beams are superimposed on each other on the surface to be irradiated with the laser beam of the object to be irradiated with the laser beam by the condenser lens 18. Thus, even if the pulsed laser beam has nonuniform energy density distribution before passing through the laser beam superimposing optical member 11, the pulsed laser beam comes to have uniform or nearly uniform energy density distribution on the surface to be irradiated with the laser beam of the object to be irradiated with the laser beam. In an example of FIG. 2, the convex cylindrical lenses 17a as many as the polarization control elements 13a, 13b, 13c, 15a, and 15b are provided. Accordingly, an entire laser irradiation region of the surface to be irradiated with the laser beam is irradiated with beam components from the polarization control elements, which pass through the convex cylindrical lenses 17a. Note that the object to be irradiated with the laser beam is a semiconductor substrate in this embodiment mode. The term "semiconductor substrate" means a substrate which is formed of a semiconductor such as a silicon wafer or an insulating substrate over the surface of which a semiconductor film is formed. In addition, the reference numeral 12 denotes a short-side direction condenser lens which concentrates the pulsed laser beam on the surface to be irradiated with the laser beam with respect to a perpendicular direction on the plane of the paper of FIG. 1.

Figures 3A, 3B:
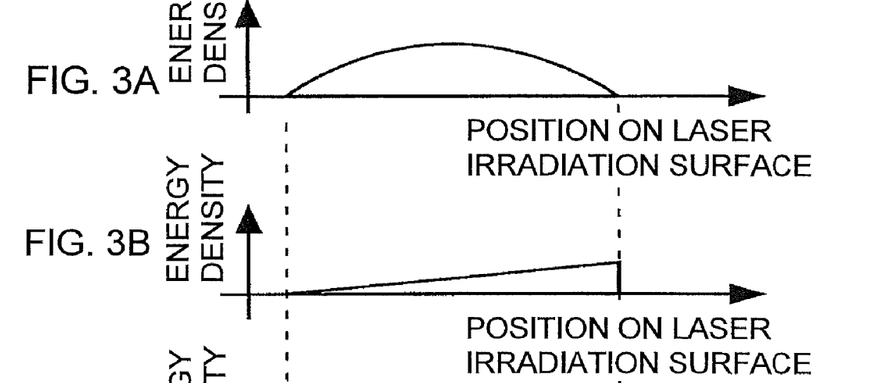
FIGS. 3A to 3F show energy density distributions of beam components in beams on a surface irradiated with a laser beam and an energy distribution in which these energy density distributions are superimposed on each other.
Figures 3C, 3D, 3E, 3F:
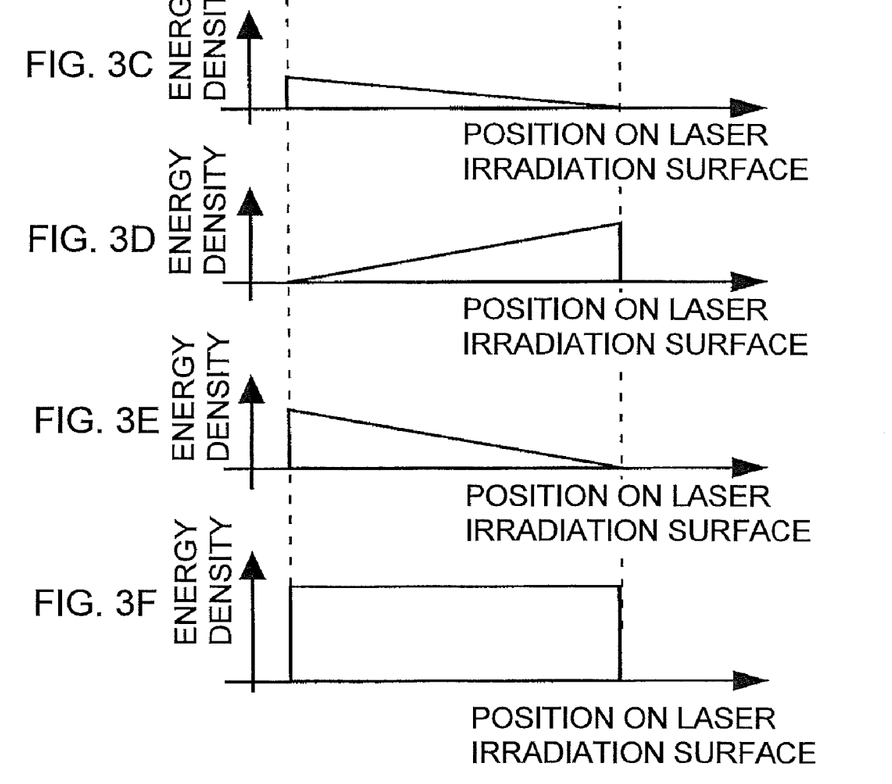

Next, the function of the laser irradiation apparatus 10 with the above-described structure will be described. The surface to be irradiated with the laser beam is irradiated with beam components in the first polarization state and beam components in the second polarization state from the polarization control member 9 so as to even out an energy density distribution over an entire laser irradiation region of the surface to be irradiated with the laser beam. Accordingly, in each position of the laser irradiation region, the first polarization state and the second polarization state are mixed. As described above, when beam components in the first linearly-polarized state pass through the half wave plate (the polarization control elements 13a, 13b, and 13c), the polarization state is changed to the second linearly-polarized state. When beam components in the second linearly-polarized state pass through the half wave plate, the polarization state is changed to the first linearly-polarized state. On the other hand, the polarization control elements 15a and 15b do not change the polarization state of beam components which pass through them. Thus, both of the pulsed laser beam in the first linearly-polarized state and the pulsed laser beam in the second linearly-polarized state come to have both of beam components in the first linearly-polarized state and beam components in the second linearly-polarized state by passing through the polarization control member 9. In FIG. 2, an energy density distribution of the pulsed laser beam before passing through the polarization control member 9 is shown corresponding to positions of the polarization control elements 13a, 13b, 13c, 15a, and 15b. FIGS. 3A to 3E show energy density distributions of beam components which have passed through the polarization control elements 13a, 13b, 13c, 15a, and 15b, respectively, on a surface to be irradiated with a laser beam in the case where the pulsed laser beam that has the energy density distribution shown in FIG. 2 and is in the first linearly-polarized state passes through the polarization control member 9. In this case, the energy density distribution is affected by the laser beam superimposing optical member 11. In FIGS. 3A to 3F, the vertical axes represent arrangement directions on the surface to be irradiated with the laser beam, and the horizontal axes represent energy density distributions of beam components. Specifically, FIG. 3A shows an energy density distribution of beam components which passes through the polarization control element 13a and is in the second linearly-polarized state on the surface to be irradiated with the laser beam. FIG. 3B shows an energy density distribution of beam components which passes through the polarization control element 13b and is in the second linearly-polarized state on the surface to be irradiated with the laser beam. FIG. 3C shows an energy density distribution of beam components which passes through the polarization control element 13c and is in the second linearly-polarized state on the surface to be irradiated with the laser beam. FIG. 3D shows an energy density distribution of beam components which passes through the polarization control element 15a and is in the first linearly-polarized state on the surface to be irradiated with the laser beam. FIG. 3E shows an energy density distribution of beam components which passes through the polarization control element 15b and is in the first linearly-polarized state on the surface to be irradiated with the laser beam. FIG. 3F shows a schematic energy density distribution in which energy density distributions shown in FIGS. 3A to 3F are superimposed on each other. As shown in this energy density distribution, the first linearly-polarized state and the second linearly-polarized state are mixed in each position of the laser irradiation region of the surface to be irradiated with the laser beam. Further, in this embodiment mode, the total amount of energy shown in FIGS. 3A to 3C and the total amount of energy shown in FIGS. 3D and 3E are the same.

Furthermore, although FIG. 2 and FIGS. 3A to 3F show the case where the pulsed laser beam in the first linearly-polarized state passes through the polarization control member 9, the same can apply to the case where the pulsed laser beam in the second linearly-polarized state passes through the polarization control member 9. In this case, FIG. 3A shows an energy density distribution of beam components which passes through the polarization control element 13a and is in the first linearly-polarized state. FIG. 3B shows an energy density distribution of beam components which passes through the polarization control element 13b and is in the first linearly-polarized state. FIG. 3C shows an energy density distribution of beam components which passes through the polarization control element 13c and is in the first linearly-polarized state. FIG. 3D shows an energy density distribution of beam components which passes through the polarization control element 15a and is in the second linearly-polarized state. FIG. 3E shows an energy density distribution of beam components which passes through the polarization control element 15b and is in the second linearly-polarized state.

Note that the object to be irradiated with the laser beam is transferred in a perpendicular direction on the plane of the paper of FIGS. 1 and 2 by a transport device (not shown) while the surface to be irradiated with the laser beam of the object to be irradiated with the laser beam is irradiated with the pulsed laser beam by the laser irradiation apparatus 10. Accordingly, a desired range of the object to be irradiated with the laser beam is irradiated with the pulsed laser beam.

In the laser irradiation apparatus 10 of the above Embodiment Mode 1 of the present invention, in the case where pulsed laser beams which are in different polarization states and are emitted from the first laser light source 3 and the second laser light source 4 are guided to pass through the same optical path for irradiation of the object to be irradiated with the laser beams, each of the pulsed laser beams emitted from the first laser light source 3 and the second laser light source 4 is divided into plural beam components in different polarization states (the first polarization state and the second polarization state) by the polarization control member 9, and the beam components in different polarization states are superimposed on each other on the surface to be irradiated with the laser beam of the object to be irradiated with the laser beam by the laser beam superimposing optical member 11. Accordingly, both of the pulsed laser beams are in a state in which the first polarization state and the second polarization state are mixed on the surface to be irradiated with the laser beam. Thus, the occurrence of adverse effects on the object to be irradiated with the laser beam due to the difference in the polarization state between the pulsed laser beams can be prevented or significantly reduced.

Further, the length of the first polarization control portion 13 in the arrangement direction and the length of the second polarization control portion 15 in the arrangement direction are set so that the total amount of energy of the beam components that have passed through the first polarization control portion 13 is equal to or substantially equal to that of the beam components that have passed through the second polarization control portion 15; accordingly, in both of the pulsed laser beams emitted from the first laser light source 3 and the second laser light source 4, the total amount of energy of the beam components in the first polarization state can be equal to or substantially equal to that of the beam components in the second polarization state on the surface to be irradiated with the laser beam. Accordingly, laser irradiation (e.g., laser annealing of a semiconductor substrate) can be performed more stably.

Furthermore, since the second polarization control portion 15 is formed using a material such that the optical path length of the pulsed laser beam inside the second polarization control portion 15 is formed using the same material as that of the optical path length of the pulsed laser beam inside the first polarization control portion 13, difference in the optical path length of the pulsed laser beam does not occur between the second polarization control portion 15 and the first polarization control portion 13. Accordingly, adverse effects due to difference in the optical path length (e.g., image position error on a surface to be irradiated with a laser beam) can be prevented.

Embodiment 1

Figure 4A:
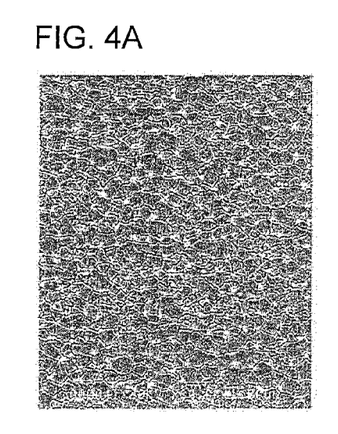
FIGS. 4A to 4F are electron microscope images of a surface irradiated with a laser beam in order to show effects obtained according to Embodiment Mode 1.
Figure 4B:
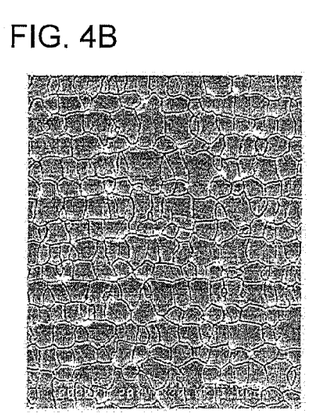
Figure 4C:
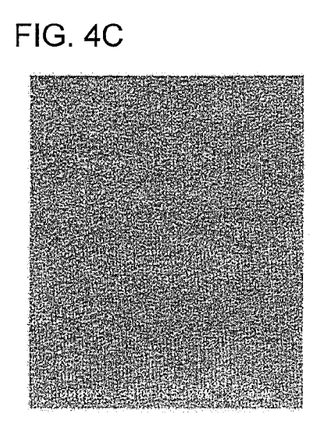
Figure 4D:
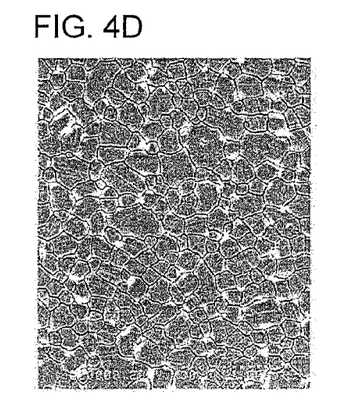
Figure 4E:
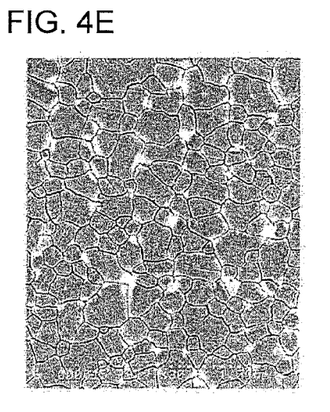
Figure 4F:
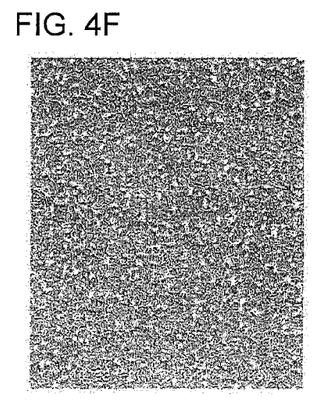
Figure 5A:
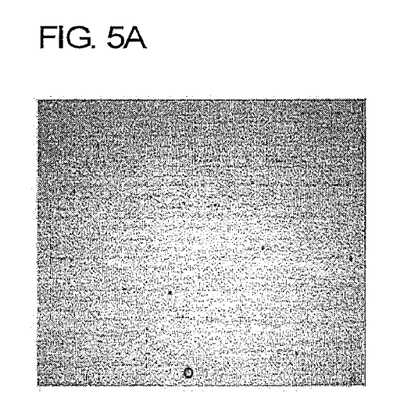
FIGS. 5A to 5F are optical microscope images of a surface irradiated with a laser beam in order to show effects obtained according to Embodiment Mode 1.
Figure 5B:
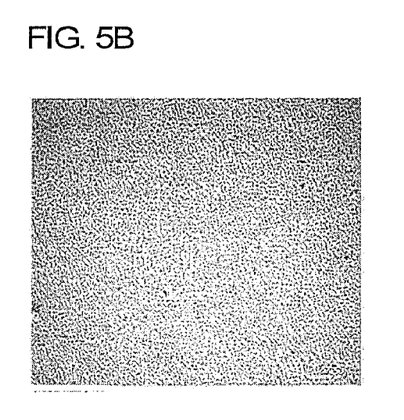
Figure 5C:
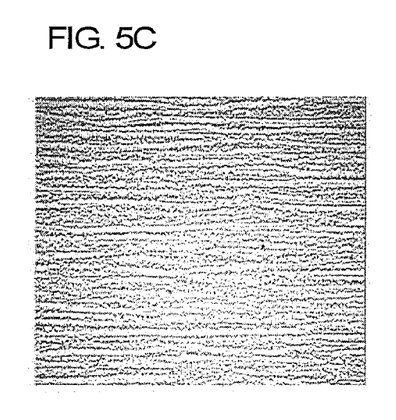
Figure 5D:
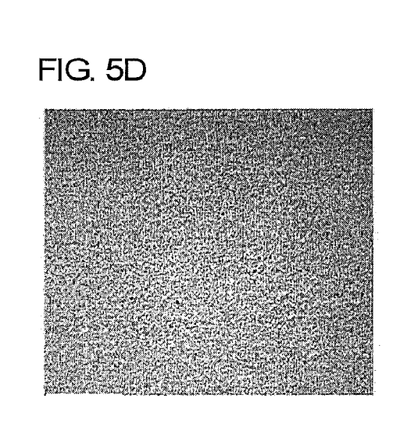
Figure 5E:
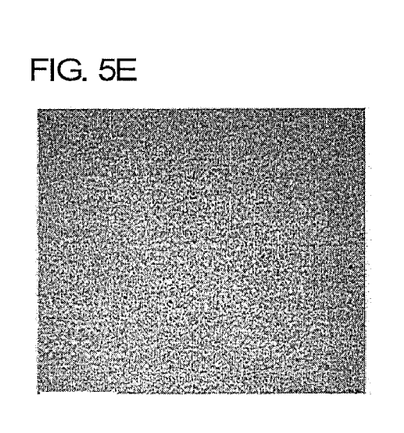
Figure 5F:
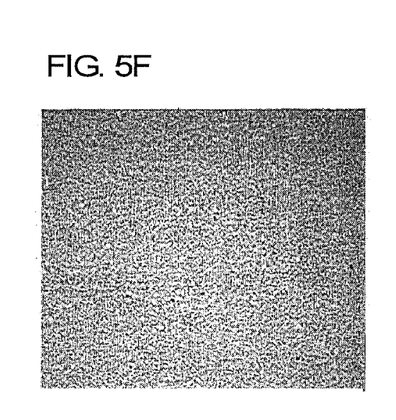

FIGS. 4A to 4F and FIGS. 5A to 5F each are images of a surface irradiated with a laser beam in order to show effects obtained according to Embodiment Mode 1. FIGS. 4A to 4F are electron microscope images. FIGS. 5A to 5F are optical microscope images. FIGS. 4A to 4C and FIGS. 5A to 5C each are images of a surface irradiated with a laser beam of a semiconductor substrate which is obtained by laser irradiation of the semiconductor substrate without using the polarization control member 9. FIG. 4A and FIG. 5A show the case of irradiation with a p-polarized pulse laser beam. FIG. 4B and FIG. 5B show the case of irradiation with an s-polarized pulse laser beam. FIG. 4C and FIG. 5C are low magnification images showing the case of laser irradiation with a composition of a p-polarized pulse laser beam and an s-polarized pulse laser beam (that is, the case where laser irradiation is performed using a structure in which the polarization control member 9 is omitted in FIG. 1). On the other hand, FIGS. 4D to 4F and FIGS. 5D to 5F each are images of a surface irradiated with a laser beam of a semiconductor substrate which is obtained by laser irradiation of the semiconductor substrate by using the polarization control member 9. FIG. 4D and FIG. 5D show the case of laser irradiation with a p-polarized pulse laser beam (that is, the case where only the first laser light source 3 is used of the first laser light source 3 and the second laser light source 4 in FIG. 1). FIG. 4E and FIG. 5E show the case of laser irradiation with an s-polarized pulse laser beam (that is, the case where only the second laser light source 4 is used of the first laser light source 3 and the second laser light source 4 in FIG. 1). FIG. 4F and FIG. 5F are low magnification images showing the case of laser irradiation with a composition of a p-polarized pulse laser beam and an s-polarized pulse laser beam (that is, the case where laser irradiation is performed using a structure of FIG. 1). FIGS. 4A to 4F and FIGS. 5A to 5F are compared to each other. Between FIGS. 4A and 5A and FIGS. 4B and 5B, there is a difference in the polarization state. Thus, as shown in FIG. 4C and FIG. 5C, unevenness due to difference in the polarization state is caused when a combined pulse laser beam is used for laser irradiation. On the other hand, in the case of this embodiment mode, between FIGS. 4D and 5D and FIGS. 4E and 5E, there is little difference in the polarization state. Thus, as shown in FIG. 4F and FIG. 5F, unevenness due to difference in the polarization state is not caused when a combined pulse laser beam is used for laser irradiation.

Embodiment Mode 2

Figure 6:
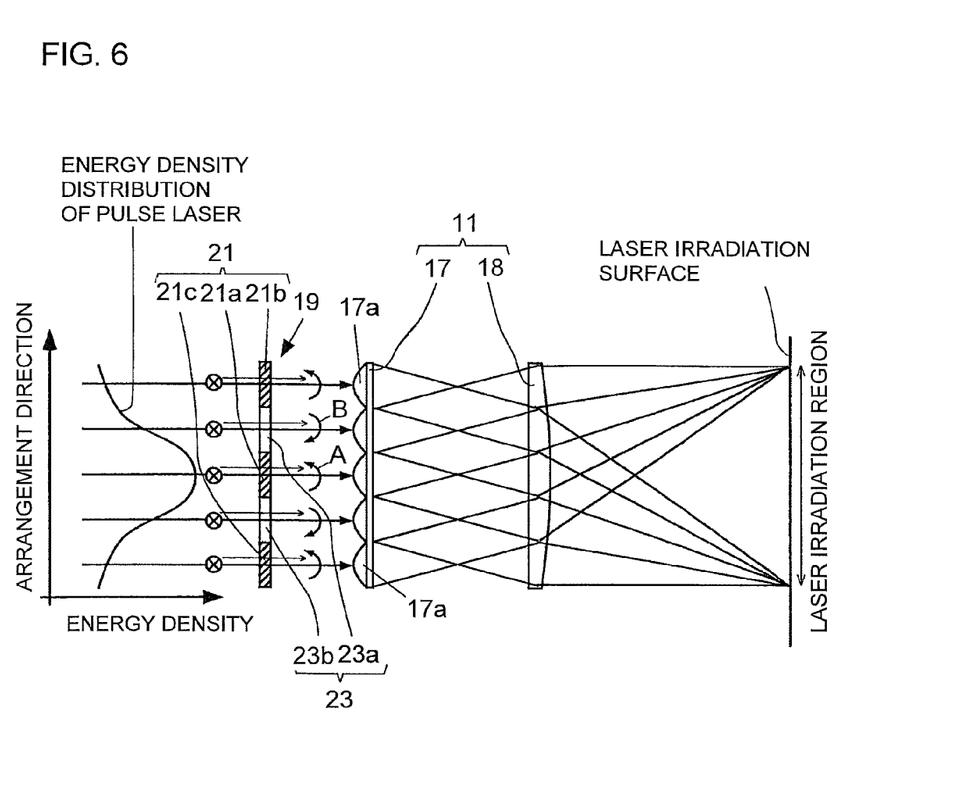
FIG. 6 is an enlarged view of a portion II in FIG. 1 and shows a case of Embodiment Mode 2.

The structure of a polarization control member of a laser irradiation apparatus according to Embodiment Mode 2 of the present invention is different from that of the polarization control member 9 of Embodiment Mode 1. The other structures of Embodiment Mode 2 may be the same as those of Embodiment Mode 1. FIG. 6 is an enlarged view of a portion II in FIG. 1 and shows a case of Embodiment Mode 2.

Parts of the structure of a polarization control member 19, which are similar to those of the structure of Embodiment Mode 1, will be described. As shown in FIG. 6, the polarization control member 19 controls the polarization state of the pulsed laser beam from the optical path combining optical member 7. The polarization control member 19 is arranged in an arrangement direction (an up and down direction in FIG. 6). The polarization control member 19 is provided with a first polarization control portion 21 and a second polarization control portion 23, through which beam components of the pulsed laser beam from the optical path combining optical member 7 pass. The first polarization control portion 21 and the second polarization control portion 23 are formed so that the polarization states of the beam components that have passed through the first polarization control portion 21 and the beam components that have passed through the second polarization control portion 23 are different polarization states of the first polarization state and the second polarization state. At least one of the first polarization control portion 21 and the second polarization control portion 23 may be divided into plural parts so as to sandwich all or a part of the other in the arrangement direction. In an example of FIG. 6, the first polarization control portion 21 is divided into three polarization control elements 21a, 21b, and 21c. The second polarization control portion 23 is divided into two polarization control elements 23a and 23b. The polarization control element 23a is sandwiched between the polarization control elements 21a and 21b in the arrangement direction. The polarization control element 23b is sandwiched between the polarization control elements 21a and 21c in the arrangement direction. The polarization control element 21a is sandwiched between the polarization control elements 23a and 23b in the arrangement direction. In addition, the length of the first polarization control portion 21 in the arrangement direction and the length of the second polarization control portion 23 in the arrangement direction are set so that the total amount of energy of the beam components that have passed through the first polarization control portion 21 is equal to or substantially equal to that of the beam components that have passed through the second polarization control portion 23.

Parts of the structure of the polarization control member 19, which are different from those of the structure of Embodiment Mode 1, will be described. According to Embodiment Mode 2, the first polarization control portion 21 and the second polarization control portion 23 of the polarization control member 19 are each quarter wave plates which have an optical axis at an angle of 45° with respect to each of the polarization directions of the pulsed laser beam emitted from the first laser light source 3 (a perpendicular direction on the plane of the paper of FIG. 6) and the pulsed laser beam emitted from the second laser light source 4 (an up and down direction on the plane of the paper of FIG. 6). The optical axes of the first polarization control portion 21 and the second polarization control portion 23 are at 90° to each other.

Thus, when beam components which are emitted from the first laser light source 3 and are in the first linearly-polarized state pass through the first polarization control portion 21, the beam components are changed to beam components of circularly polarized light whose polarization direction rotates in a direction denoted by an arrow A in FIG. 6. Further, when beam components which are emitted from the first laser light source 3 and are in the first linearly-polarized state pass through the second polarization control portion 23, the beam components are changed to beam components of circularly polarized light whose polarization direction rotates in a direction denoted by an arrow B in FIG. 6, which is an opposite direction to the direction denoted by the arrow A. That is, the beam components of circularly polarized light that rotates in the direction denoted by the arrow A are in the first polarization state, and the beam components of circularly polarized light that rotates in the direction denoted by the arrow B are in the second polarization state.

FIG. 6 shows a case where the pulsed laser beam in the first linearly-polarized state enters the polarization control member 19. In the case where beam components which are emitted from the second laser light source 4 and are in the second linearly-polarized state pass through the first polarization control portion 21, the beam components are changed to beam components of circularly polarized light whose polarization direction rotates in the direction denoted by the arrow B in FIG. 6, which is an opposite direction to the direction denoted by the arrow A. Further, in the case where beam components which are emitted from the second laser light source 4 and are in the second linearly-polarized state pass through the second polarization control portion 23, the beam components are changed to beam components of circularly polarized light whose polarization direction rotates in the direction denoted by the arrow A in FIG. 6. That is, the beam components of circularly polarized light that rotates in the direction denoted by the arrow B are in the first polarization state, and the beam components of circularly polarized light that rotates in the direction denoted by the arrow A are in the second polarization state.

According to the laser irradiation apparatus of the above Embodiment Mode 2, each of the pulsed laser beams emitted from the first laser light source 3 and the second laser light source 4 is divided into beam components in the first polarization state and beam components in the second polarization state by the optical path combining optical member 7, and the beam components in the first polarization state and the beam components in the second polarization state are superimposed on each other on the surface to be irradiated with the laser beam of the object to be irradiated with the laser beam by the laser beam superimposing optical member 11. Accordingly, both of the pulsed laser beams are in a state in which the first polarization state and the second polarization state are mixed on the surface to be irradiated with the laser beam. Thus, the occurrence of adverse effects on the object to be irradiated with the laser beam due to the difference in the polarization state between the pulsed laser beams can be prevented or significantly reduced. As for other effects, effects and functions which are similar to those of the laser irradiation apparatus 10 described in the above Embodiment Mode 1 can also be obtained in Embodiment Mode 2.

Another Embodiment Mode

Figure 7A:
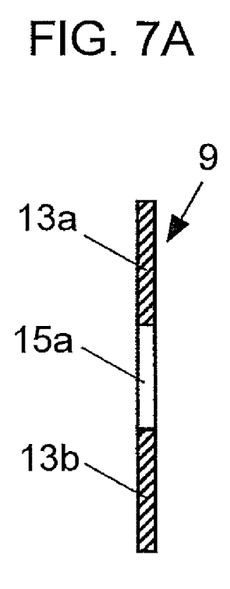
FIGS. 7A to 7C each show a modified example of a polarization control member according to Another Embodiment Mode.
Figure 7B:
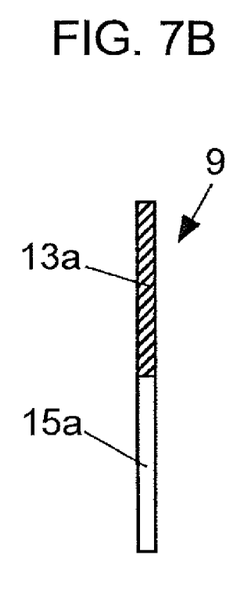
Figure 7C:
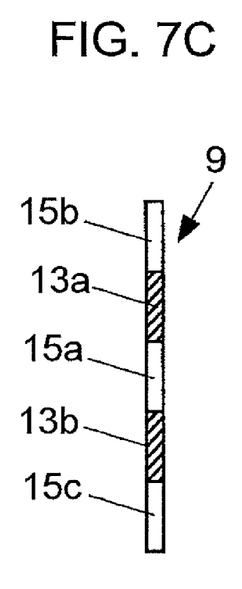
Figure 8:
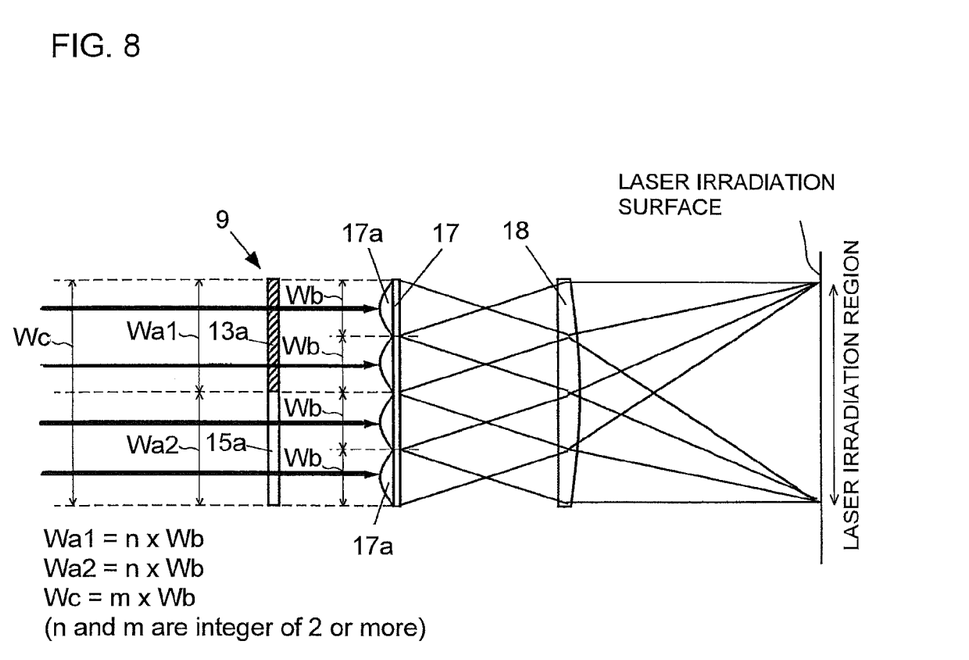
FIG. 8 shows a modified example of a polarization control member and a cylindrical lens array according to Another Embodiment Mode.

In Embodiment Mode 1 or Embodiment Mode 2, a modified example, which is described below, can be employed. A modified example of Embodiment Mode 1 will be described below; however, the same modified example can be employed for Embodiment Mode 2. The polarization control member 9 of Embodiment Mode 1 may include polarization control elements 13a and 13b and polarization control elements 15a, 15b, and 15c as shown in FIGS. 7A to 7C. FIG. 7A shows a polarization control member 9 that includes two polarization control elements 13a and 13b and one polarization control element 15a. FIG. 7B shows a polarization control member 9 that includes one polarization control element 13a and one polarization control element 15a. FIG. 7C shows a polarization control member 9 that includes two polarization control elements 13a and 13b and three polarization control elements 15a, 15b, and 15c. In FIGS. 7A to 7C, the length of the first polarization control portion 13 including the polarization control elements 13a and 13b in the arrangement direction and the length of the second polarization control portion 15 including the polarization control elements 15a, 15b, and 15c in the arrangement direction are set so that the total amount of energy of the beam components that have passed through the first polarization control portion 13 is equal to or substantially equal to that of the beam components that have passed through the second polarization control portion 15, as described above. Further, in Embodiment Mode 1, as shown in FIG. 8, the first polarization control portion 13 may include one polarization control element 13a, and the second polarization control portion 15 may include one polarization control element 15a. A width Wa1 of the polarization control element 13a in an arrangement direction and a width Wa2 of the polarization control element 15b in an arrangement direction (Wa1=Wa2 in FIG. 8) can be n times as large as a width Wb of the convex cylindrical lens 17a of the cylindrical lens array 17 (note that n is an integer more than one). In this case, it is preferable that a width Wc of the pulsed laser beam at an incidence plane when entering the polarization control member 9 in an arrangement direction be m times as large as the width Wb of the convex cylindrical lens 17a (note that m is an integer more than one). Accordingly, the number of the polarization control element 13a and the polarization control element 15a can be reduced. Furthermore, an entire laser irradiation region of the surface to be irradiated with the laser beam can be irradiated with beam components which have passed through the polarization control element 13a and the polarization control element 15a in an arrangement direction. Thus, even if the number of the polarization control element 13a and the polarization control element 15a is reduced, generation of a portion which has relatively high energy density of the pulsed laser beams in the first polarization state or the second polarization state in the laser irradiation region can be prevented. FIG. 8 shows an example of a case where one polarization control element 13a and one polarization control element 15a are provided. In the case where other numbers of polarization control elements are provided, the formulas "Wa1=n1×Wb, Wa2=n2×Wb, and Wc=m×Wb" are satisfied (note that n1, n2, and m are integers more than one) so that similar effects can be obtained.

The present invention is not limited to the above embodiment modes, and it is needless to say that the mode and details can be changed in various ways without departing from the scope and spirit of the present invention.

For example, although the structure in which the first polarization control portion 13 (the polarization control elements 13a to 13c) and the second polarization control portion 15 (the polarization control elements 15a and 15b) are arranged in an up and down direction in FIG. 2 is described, the structure is not limited thereto. For example, in the case where the cross-sectional shape of the pulsed laser beam that enters the polarization control member 9, which is perpendicular to the traveling direction of the pulsed laser beam, is also expanded in a perpendicular direction on the plane of the paper of FIG. 2, the first polarization control portion 13 (the polarization control elements 13a to 13c) and the second polarization control portion 15 (the polarization control elements 15a and 15b) can also be arranged in a perpendicular direction on the plane of the paper of FIG. 2 as in the case of an up and down direction in FIG. 2. The same can apply to other cases such as FIG. 6.

This application is based on Japanese Patent Application serial No. 2008-075027 filed with Japan Patent Office on Mar. 24, 2008, the entire contents of which are hereby incorporated by reference.

What is claimed is:

1. A laser irradiation apparatus comprising:
   a first laser light source configured to emit a first polarized pulse laser beam;
   a second laser light source configured to emit a second polarized pulse laser beam which is different from the first polarized pulse laser beam;
   an optical path combining member configured to guide the first polarized pulse laser beam and the second polarized pulse laser beam to pass through a same optical path;
   a polarization control member arranged in a direction perpendicular to a traveling direction of laser beams, wherein the polarization control member includes a first polarization control portion and a second polarization control portion, each of which controls a polarization state of beam components of the pulsed laser beam from the optical path combining member, wherein the polarization state controlled by the first polarization control portion is different from that controlled by the second polarization control portion; and
   a laser beam superimposing member configured to superimpose the pulsed laser beam which has passed through the first polarization control portion and the pulsed laser beam which has passed through the second polarization control portion with each other on a surface to be irradiated of an object,
   wherein the first laser light source and the second laser light source emit linearly-polarized pulse laser beams of which polarization directions are at 90° to each other,
   wherein the first polarization control portion and the second polarization control portion are quarter wave plates which each have an optical axis at an angle of 45° with respect to each of the polarization directions of the pulsed laser beams emitted from the first laser light source and the second laser light source, and
   wherein the optical axes of the first polarization control portion and the second polarization control portion are at 90° to each other.

2. The laser irradiation apparatus according to claim 1, further comprising a pulse control device which controls the first laser light source and the second laser light source so as not to synchronize timing of emission of the pulsed laser beams from the first laser light source and the second laser light source.

3. The laser irradiation apparatus according to claim 1, further comprising a beam expander which adjusts a shape of the pulsed laser beam from the optical path combining member so that the pulsed laser beam from the optical path combining member has an elongated shape and which sends the pulsed laser beam having an elongated shape to the polarization control member.

4. The laser irradiation apparatus according to claim 1, wherein the length of the first polarization control portion in an arrangement direction and the length of the second polarization control portion in an arrangement direction are set so that a total amount of energy of beam components of the pulsed laser beam which have passed through the first polarization control portion is substantially equal to a total amount of beam components of the pulsed laser beam which have passed through the second polarization control portion.

5. The laser irradiation apparatus according to claim 1, wherein at least one of the first polarization control portion and the second polarization control portion is divided into plural parts so as to sandwich all or a part of the other of the first polarization control portion and the second polarization control portion in an arrangement direction.

6. The laser irradiation apparatus according to claim 1, wherein an optical path length of the pulsed laser beam inside the second polarization control portion is substantially equal to an optical path length of the pulsed laser beam inside the first polarization control portion.

* * * * *